FIG. 1.

INVENTORS
WILLIAM J. HUGHES
STEPHEN S. HAYNES
JOHN E. TRACEY
ELWOOD L. WHEELER
BY K.G.Doub
ATTORNEY

United States Patent Office 2,899,538
Patented Aug. 11, 1959

2,899,538

MACHINE FOR ELECTRICALLY WELDING ANEROID CAPSULES AND OTHER WELDABLE ARTICLES IN AN EVACUATED CHAMBER, AND METHOD

William J. Hughes, Baltimore, Stephen S. Haynes, Towson, John E. Tracey, Reisterstown, and Elwood L. Wheeler, Owings Mills, Md., assignors to Bendix Aviation Corporation, Baltimore, Md., a corporation of Delaware Application September 5, 1956, Serial No. 608,065

25 Claims. (Cl. 219—82)

This invention relates to a machine for carrying out electric welding operations in vacuum or in an inert atmosphere. The machine as reduced to practice and as illustrated and described herein utilizes electrodes by means of which dual diaphragm-type aneroid capsules may be welded and simultaneously evacuated to the desired degree. However, other weldable articles and parts may be treated simply by changing the electrodes to conform to the work.

Figure 9:
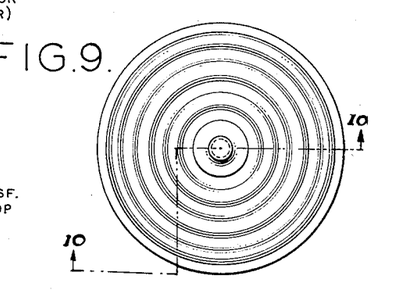
Fig. 9 is a plan view of an aneroid capsule of the type which may be simultaneously welded and evacuated by the method and machine of the subject invention.
Figure 10:
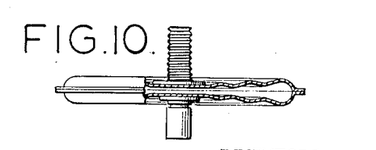
Fig. 10 is a view in section and elevation taken about on the line 10—10, Fig. 9.

Aneroid capsules of the type to which the electrodes of the herein-disclosed machine are adapted are made up of a pair of reversely dished metallic diaphragms or half-shells which are joined and sealed at their peripheral edges and evacuated to a predetermined internal pressure; they may be arranged singly or in stacks to make up a complete aneroid, depending upon requirements. Figures 9 and 10 illustrate a common type of capsule. In the type shown the peripheral flanges are in direct contact and welded to one another, but in other types a supporting or mounting ring is interposed between the flanges and in still other types there is a single diaphragm having its peripheral flange welded to a supporting and mounting ring. In the latter types, evacuation naturally does not constitute a step in the fabrication process. In the past both soldering and welding techniques have been employed in joining the half-shells together at their peripheral edges, or in joining the said edges to an interposed mounting ring. Welding is to be preferred since it eliminates a number of steps such as cleaning, fluxing and tinning and it also results in a superior over-all product. Regardless of how the diaphragms or half-shells are joined, evacuation is of course a necessary step in the type of capsule used to illustrate the operation of the improved welding machine. It has heretofore been proposed to evacuate the capsule during the joining operation by the soldering method, but as far as known, no successful method for evacuating and welding simultaneously has been previously devised. This is probably due to the fact that in welding radically different problems are involved. Thus considerable heat is generated when welding is carried on in a closed chamber, and furthermore the evacuating operation must be timed to take place before the capsule is sealed.

In carrying out the present method, diaphragm blanks are first cut from suitable stock and shaped in a forming press. The stock may be comprised of any suitable weldable material. In practice an alloy known as Ni-Span "C" has been used successfully; it is produced in strip form and in coils of specified thickness and width. The blanks are then heat treated in a non-oxidizing furnace to harden the metal and impart the necessary springiness thereto. If supporting studs are required, these are then applied to one or both half-shells by a projection welder. The shells are then ready for the edge welding process. To do this, the respective half-shells are positioned in a pair of annular upper and lower electrodes disposed in a welding chamber which is automatically closed off from the atmosphere when the electrodes are brought into operative relation one with the other. Evacuation of the chamber then proceeds until the specified internal pressure of the capsule is attained; and during evacuation, the peripheral edges of the diaphragm are subjected to a progressive welding pressure between the electrodes, which are interposed in a welding circuit having automatic timing controls for the welding dwell period, the duration and degree of evacuation pressure, and the circulation of an electrode cooling medium.

The machine and method of the present invention not only ensures a superior type of capsule but permits production at a relatively high rate which materially lowers the over-all cost of the capsule. By evacuating and welding at the same time, a separate evacuating operation is eliminated, and by welding in a vacuum or inert atmosphere, not only is burning of the diaphragms at their meeting edges prevented but a clean and bright product results. By utilizing the progressive cycloidal welding pressure technique, not only is an even weld ensured but timing of the evacuating operation is rendered less sensitive than is possible where the edges of the half-shells are brought flush together and joined over the entire area of their meeting edges simultaneously.

The primary object of the present invention, therefore, is to provide an improved machine for carrying out electrical welding operations in an evacuated chamber.

Another and more specific object is to provide a machine whereby aneroid capsules of the type specified may be produced at a rapid rate while at the same time improving the quality of the finished article.

The foregoing and other objects and advantages will become apparent in view of the following description taken in conjunction with the drawings wherein:

Fig. 7 is a substantially central transverse section of the upper electrode and its holder;

Figs. 8 and 8A are views in detail sectional elevational and bottom plan, respectively, of the member in which the electrode holder of Fig. 7 is mounted;

The evacuating and welding machine proper is shown more or less in detail in Figs. 1, 2, 3 and 4. In general, the machine comprises a lower stationary base frame topped by an annulus which defines the outer surrounding wall of the lower half of a welding chamber; and centrally of this annulus and base frame there is mounted a non-rotating reciprocating shaft, terminating at its upper end in a chuck or electrode holder for the lower electrode. A flexible seal is inserted between the electrode holder and its surrounding wall or frame structure to prevent the infiltration of air into the welding chamber at this point and to also provide a chamber beneath the chuck into which air under pressure is periodically introduced for raising the electrode holder or chuck and lower electrode carried thereby into welding position with respect to the upper electrode and to generate the desired welding pressure. The electrode holder and its supporting shaft and associated surrounding frame structure may be aptly termed the "lower fixture" of the machine. The upper part of the machine, or what may be termed the "upper fixture," is bodily reciprocal with respect to the lower fixture; it comprises a main carrying frame terminating at its lower end in an annulus which defines the outer surrounding wall of the upper half of the welding chamber. Within this upper supporting frame there is mounted a rotatable wobble drive gear having a body portion or block through which projects, at an angle to the vertical axis of the block, a non-rotatable fixture-supporting shaft, terminating at its lower end in an outwardly-flared dished or concave head carrying an upper electrode holder, to which is connected the upper electrode. A flexible seal is provided between the said head and annulus to prevent the infiltration of air into the welding chamber at such point; and there is also a flexible seal and insulator disposed on the lower annulus which is engaged by the upper annulus when the upper fixture is lowered into welding position, so that when the welding operation takes place, the welding chamber is effectively sealed from atmospheric air and at the same time the one fixture is insulated from the other. The welding chamber is operatively connected to a constantly-driven vacuum pump and also to a vent line, the vent being automatically closed during the welding operation when evacuation of the welding chamber takes place, or if desired the vent line may be used for charging the welding chamber with a suitable gas following evacuation. At the beginning of each welding cycle, an operator places a pair of capsule half-shells or diaphragms on the lower electrode and closes an electrical control circuit, whereupon the upper frame structure or fixture is lowered to close the welding chamber, the vent line is closed and the low pressure or suction line to the vacuum pump opened and evacuation proceeds; and during evacuation, the lower electrode is moved up to bring it, along with the half-shells resting thereon, in welding position with respect to the upper electrode, the wobble drive gear is rotated to impart a cycloidal or progressively circular welding pressure between the two electrodes, the welding current is turned on and the actual welding operation takes place. Following completion of the welding operation, the machine is automatically conditioned to repeat the cycle.

Figure 1:
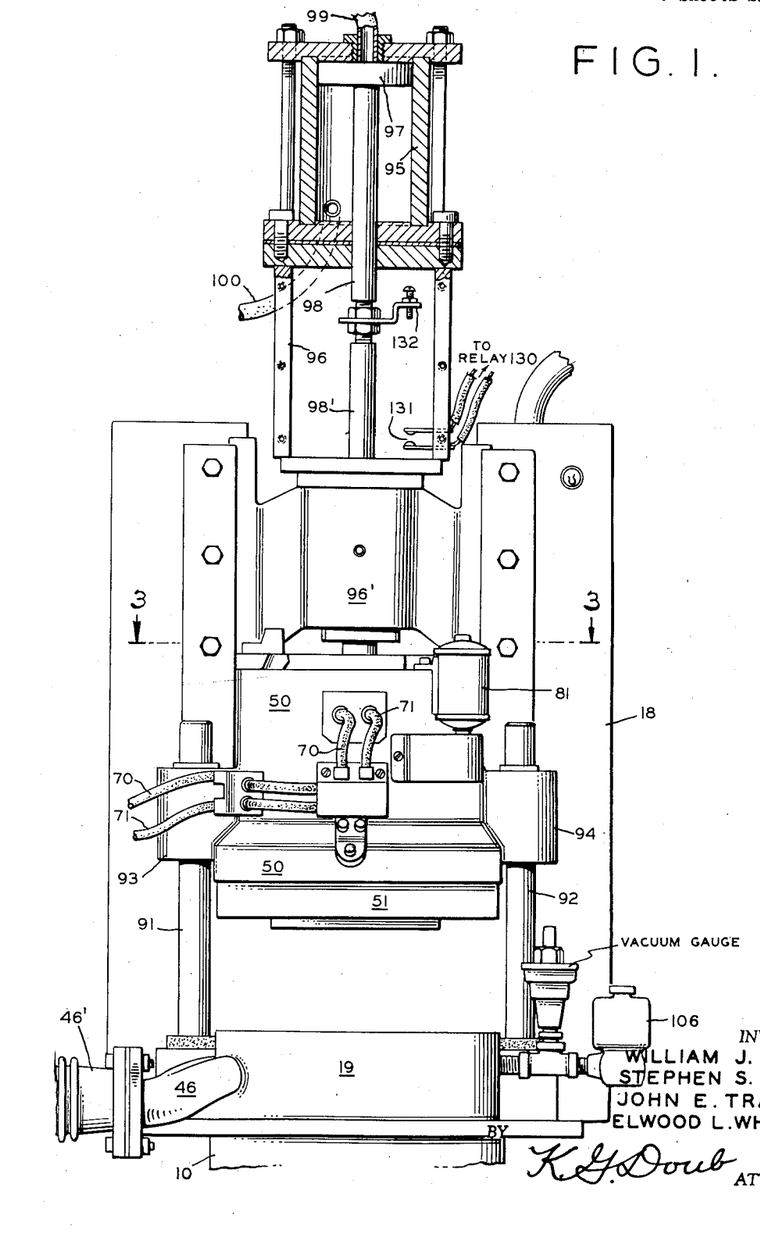
Figure 1 is a view in sectional elevation of a machine for welding and evacuating aneroid capsules in accordance with the invention.
Figure 2:
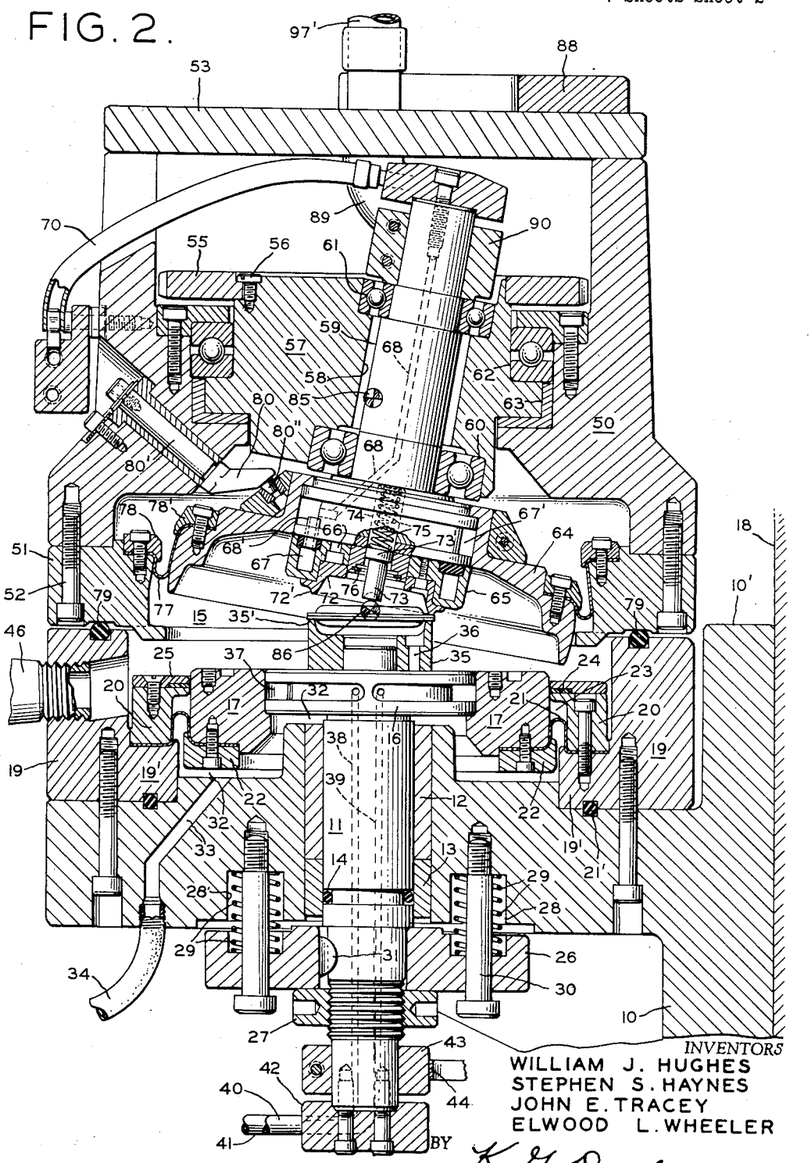
Figure 2 is an enlarged view in substantially central transverse vertical section taken on the line 2—2, Figure 3.

Referring to Figs. 1, 2, 3, 4, 5 and 11 and more frequently to Fig. 2, the lower fixture of the welding machine includes a base frame 10, bored centrally to receive a shaft 11, which is reciprocable vertically in bushings 12 and 13. A seal ring 14 coacts with bushing 13 to prevent infiltration of air to the pressure chamber 32, to be described, during the welding operation. At its upper end the shaft 11 terminates in an electrode-holder or chuck 16. The surrounding member indicated at 17 and shown in section in Fig. 2 is in reality part of the chuck 16; it is an enlargement ring or annulus which increases the effective area of the chuck to accommodate large-diameter electrodes.

The frame 10 has a bracket portion 10' adapted for attachment to the main frame structure of the welding transformer, its associated circuitry and controls, part of which frame structure is shown at 18, note Fig. 1.

An annulus 19 is seated on the frame 10; it is formed with an inner ledge of flange 19', between which and a clamp ring 20 is clamped the outer periphery of a flexible seal in the form of an annular sheet 21, which may be made of neoprene or like material capable of withstanding a certain amount of flexure and pressure. The seal 21 coacts with an O ring 21' to seal off the pressure chamber 32 from the atmosphere, while at the same time the seal 21 prevents infiltration of air into the welding chamber 15 from chamber 32 during the welding operation. The inner edge of the seal sheet 21 is clamped between the lower surface of the ring 17 and another clamp ring 22. To prevent welding chips from entering the space at 23 and damaging the seal sheet 21, a wiper 24 is fixed to the top of the ring 20 by a clamp ring 25 and is adapted to wipe the adjacent surface of the chuck enlargement member 17 when the electrode holder is reciprocated in a manner to be explained.

At its lower extremity the shaft 11 projects through an abutment collar 26, held in place by a nut 27. The collar 26 and adjacent part of the frame 10 are formed with aligned pockets or recesses 28, in which compression springs 29 are seated. These springs encircle heavy guide bolts 30, which slidingly project through the collar 26 and are anchored at their upper ends in the frame 10. A spline key 31 holds the shaft 11 against angular or turning movement with respect to the collar 26 and hence the frame 10 and other coacting parts. The springs 29 ensure return of the shaft 11 and parts carried thereby to the "down" position, the exact location of which is determined by the heads of the bolts 30.

The chamber 32 above noted is defined between the base of the electrode-holder or chuck 16, 17 and the adjacent frame structure, and air under pressure is selectively admitted to this chamber in a manner to be described by way of duct 33 and conduit 34. As will be obvious, conduit 34, if made of conducting material, must be insulated from other grounded parts of the machine, and this also holds true of any external connections which might "ground" the lower welding fixture.

The lower electrode is indicated at 35; it is seated on the holder or chuck 16 and is removably secured thereto by means such as screw studs 36. The electrode is formed with a cavity which conforms to the dish-shaped contour of the lower half-shell of the capsule to be welded, and at its periphery the said electrode is provided with a ledge 35', which firmly supports the peripheral flange of the shell. During the welding operation, the lower electrode is cooled by a suitable fluid medium, such as water, which is circulated through a closed-end channel 37, formed around the chuck 16, the fluid being conducted to one end of said channel, circulated therethrough and drained from the opposite end thereof by way of ducts 38 and 39, provided by boring the core of shaft 11. External supply and drain conduits 40 and 41 lead to and from ducts 38 and 39 by way of fitting 42.

The electric welding current from the transformer secondary is conducted to the lower electrode 35 by way of a specially-designed conductor, to be described in connection with Figs. 3, 4 and 11, thence by way of conductors 44 and 44', fitting 43, shaft 11 and chuck 16.

Figure 5:
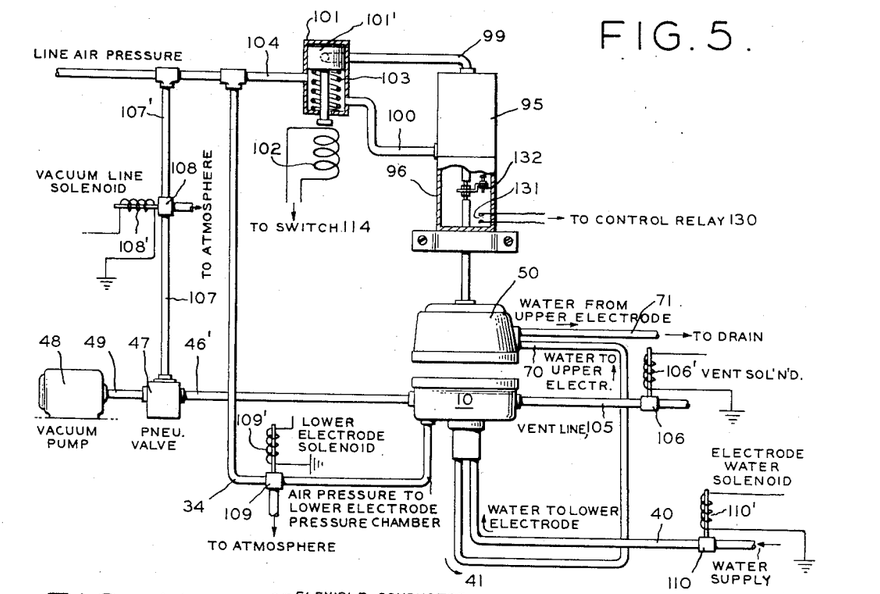
Fig. 5 is a schematic of the various controls for the machine of Figs. 1 to 4, inclusive.

An evacuating conduit connector 46 is inserted in the annular frame member 19 and communicates with the weld chamber 15; it forms part of a vacuum line 46', which leads to a pneumatic control valve 47, Fig. 5, the latter in turn communicating with a vacuum pump 48 by way of conduit 49. Valve 47 is closed by line air pressure and is spring-urged to open position.

The upper fixture (or what may be considered the upper half) of the evacuating and welding machine is movable bodily toward and from the lower or base fixture to close and open the weld chamber 15. It comprises a main hollow carrying frame made up of a vertically-elongated cylindrical member 50, having an annulus 51 connected to its bottom edge, as by screw bolts 52, and a cover plate 53 connected to its top edge as by screw bolts 54. Within the closure defined by the frame 50 is mounted a wobble drive assembly comprising a drive gear 55, which is secured as by screw studs 56 to a gear body or block 57, having a bore 58 extending therethrough at an angle with respect to the vertical axis of the block. A non-rotatable shaft 59 is received in said bore and is provided with spaced lower and upper thrust bearings 60 and 61; and the block 57 is rotatable in bearings 62 and 63. At its lower end the shaft 59 terminates in an inverted dish-shaped head 64, compare Fig. 2 with Figs. 8 and 8A; and within this head is mounted an upper electrode-holder 65, note Fig. 7, the holder being removably secured to the head as by screw studs 66. As is the case with the lower electrode holder 16, provision is made for circulating a cooling fluid through the upper holder 65. Thus an annular closed-end channel 67 is formed in the upper holder, and a cooling fluid such as water is conducted to the entrance end of this channel by way of duct 68 drilled through core of shaft 59, channel 67' formed in head 64, and short intake pipe or duct 68'. Both the channel 67 and channel 67' are similar to the channel 37 of the lower electrode holder, heretofore described. Thus the water or other coolant can circulate just short of 360°, the circular channel being interrupted by the radial boss or nib which separates the intake and exhaust ports of the channel. The water, after circulating almost completely through channel 67, is drained therefrom by way of takeoff port or short pipe (not visible in Fig. 7 but which is similar to 68'), channel 67' and duct 69, the latter paralleling the duct 68 in shaft 59 and both ducts 68 and 69 angling into the channel 67' at the lower end of the said shaft, compare Figs. 8 and 8A. Flexible conduits 70 and 71 are connected to the ducts 68 and 69, the conduit 70 communicating by way of conduit 40 with a source of supply under pressure and the conduit 71 leading to drain, compare Figs. 1 and 5.

Figures 7, 8:
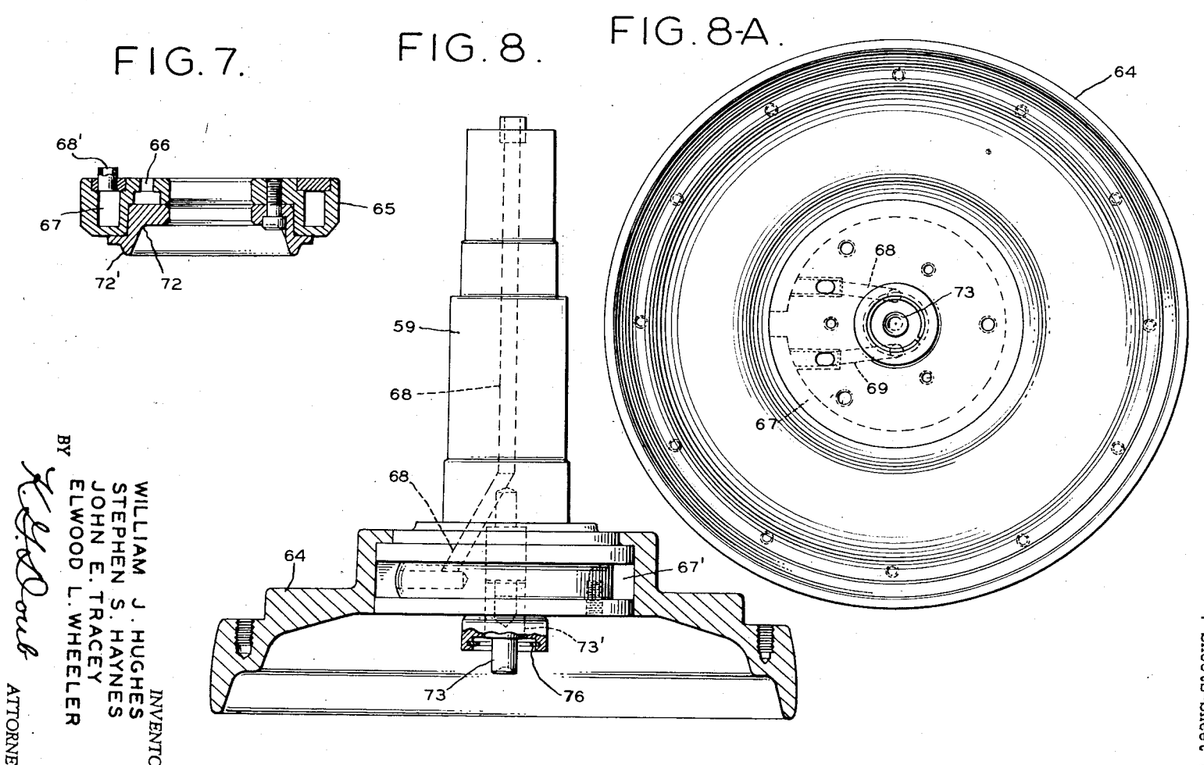

An upper electrode 72, Fig. 7, is removably secured to the holder 65; it is formed with a dish-shaped cavity which conforms to the contour of the upper half-shell of the capsule to be welded, one of which is shown in welding position on the lower electrode 35 of Fig. 2, and it has a peripheral edge 72' adapted to engage the peripheral flange of said shell.

To prevent the capsules from cocking or becoming displaced during the welding operation, a spring-pressed finger or rod 73, Figs. 2, 8 and 8A is slidingly mounted in a bore 74 formed centrally of the shaft 59, electrode holder 65 and electrode 72; it is backed by a spring 75 and has a stop flange 73' adapted to engage a removable stop member 76, retained in position by a snap ring located at the lower end of the bore. When the welding electrodes are moved into welding position with a capsule therebetween, the finger 73 engages the mounting stud which in the type of capsule shown is connected to one of the half-shells before welding and holds the capsule in place while the upper electrode "walks" around the welding flange, note the position of the parts in Fig. 2.

An annular flexible sheet-like seal 77, Fig. 2, which may be similar to the seal 21 heretofore described, has its outer edge engaged between a clamp ring 78 and the annulus 51 and its inner edge clamped between another clamp ring 78' and the head 64. This seal 77 functions to seal the weld chamber 15 around the head 64; it has sufficient slack to accommodate the wobbling action of said head during the welding operation. A large O ring 79 seats in a groove formed in the lower frame annulus 19 and provides a seal for the weld chamber between the upper and lower halves or sections of the machine during the welding operation; and it also electrically insulates the upper and lower fixtures from one another so that the only possible path of current flow is by way of the upper and lower shafts 59 and 11 and the electrode holders and electrodes carried thereby.

To prevent any tendency toward rotation of the head 64 and the parts carried thereby, a rotatable crank arm 80 has a shaft portion 80' journaled in an insulated bushing secured in an adjacent part of the frame 50 and a finger 80" projecting into an opening formed in said head, note Fig. 2. This arrangement accommodates the wobbling action of the head 64 (the crank arm 80 rotates through a 360° angle) while at the same time it holds the head against any tendency to turn, thus relieving the seal 77 of any torsional stress or strain which would otherwise result from such tendancy; and it also prevents any "backlash" movement of the upper electrode during the welding operation.

Figure 3:
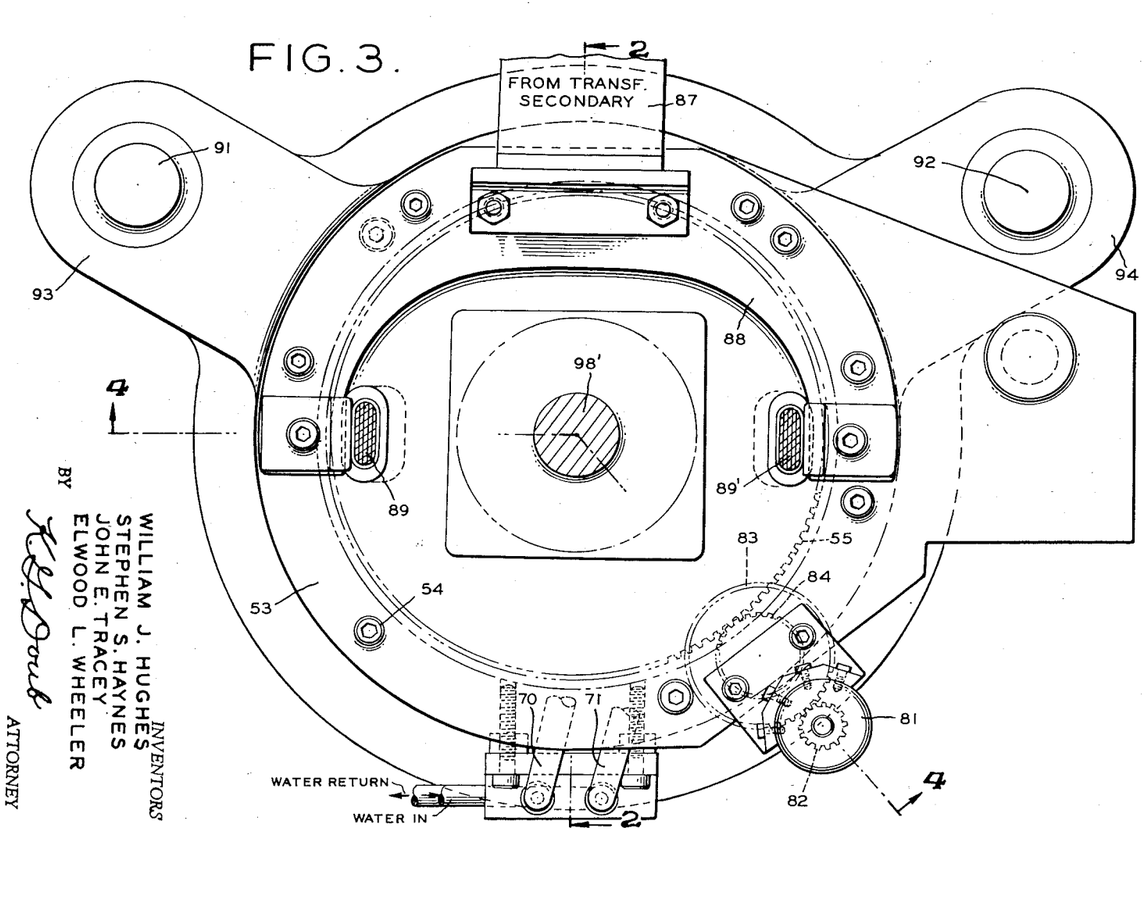
Figure 3 is a sectional top plan view taken substantially on the line 3—3, Fig. 1.
Figure 4:
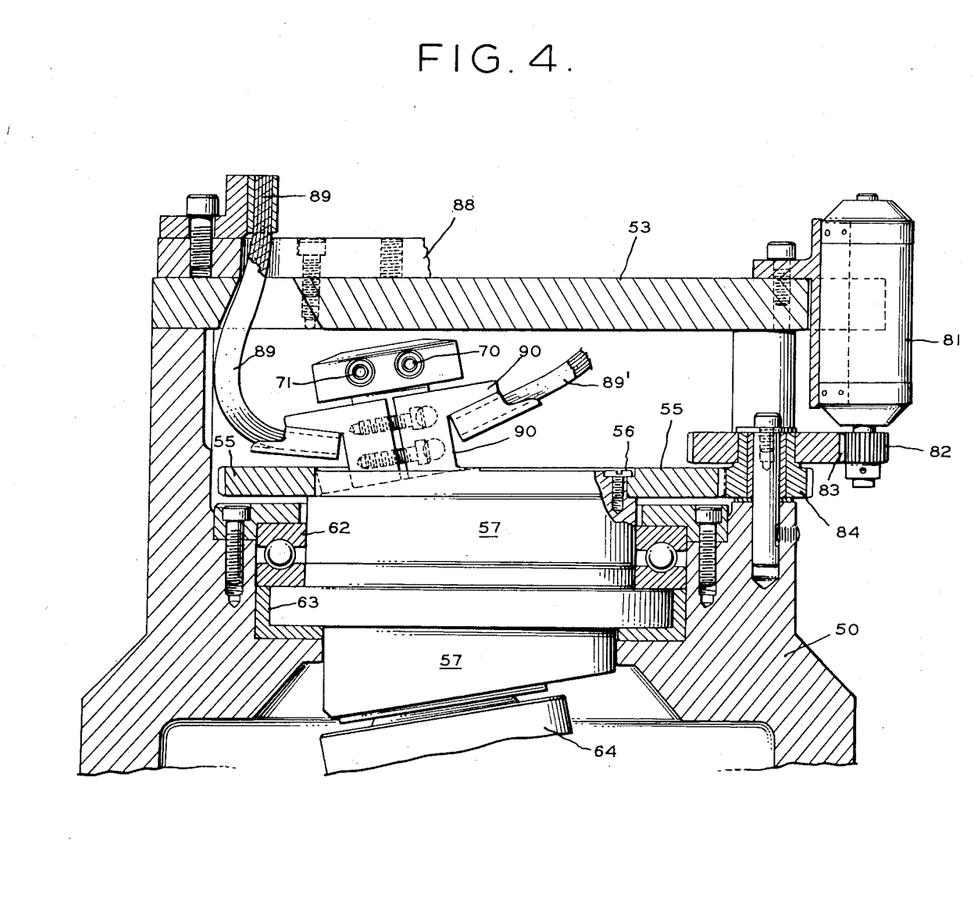
Fig. 4 is a transverse section, with certain parts in elevation, of the upper portion only of the machine, this view being taken generally on the line 4—4 of Fig. 3.

The gear 55 is driven by a combined motor and variable gear reduction unit 81, Figs. 1, 3 and 4, the drive being transmitted to said gear 55 through pinion 82 and additional reduction gears 83 and 84. When gear 55 and block or head 57 are rotated, the shaft 59 is moved bodily in a cone-shaped cycloidal path, causing the upper welding electrode to generate a force progressively around the seam to be welded in a plane substantially normal to the axis of rotation of said block. For best results, with the welding edges 72', 35' of the electrodes 72 and 35 contoured as shown, the axis of rotation of the block 57 indicated at 85 in Fig. 2, should be substantially perpendicular to, or intersect a point located centrally of the capsule to be welded and in a transverse plane just above the welding surface or flange of the capsule, such point being indicated at 86. Since the upper electrode is positively held against rotation by the rotatable crank arm 80, the welding force will be generated in a plane substantially normal to the plane of the work without any "creeping" action, which might produce an inferior seam weld due to the uneven application of the weld heat or current around the same.

Any suitable welding circuitry and associated controls available in the open market may be utilized, but where a.c. power is readily available, it is preferred to use a transformer type of welder circuit having specially-designed conductors for connecting the secondary of the transformer to the electrodes. Since the primary circuit and associated controls including the usual ignitron contactor may be similar to those found in conventional transformer type welders, such are not shown in detail.

Figure 11:
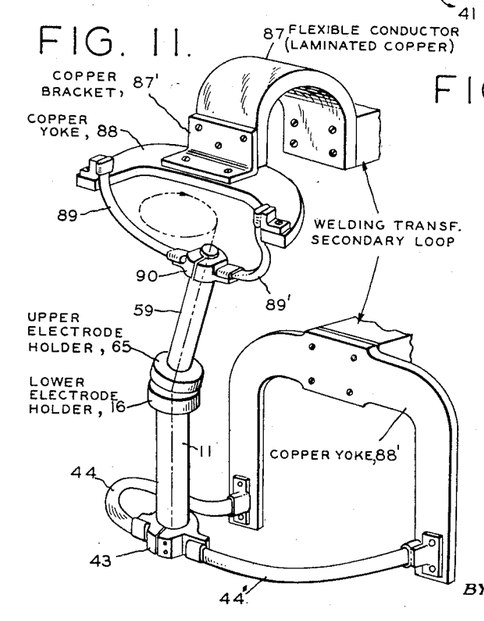
Fig. 11 is a schematic of the transformer secondary welding circuit which conducts welding current to the upper and lower electrodes.

The structural arrangement of the secondary circuit is best illustrated in Figs. 11, 3 and 4. The secondary loop of the transformer consists of a solid copper alloy member but could be of any other form capable of delivering the required output in conjunction with the primary. One end of the secondary loop is electrically connected to the upper electrode 72 by way of flexible laminated conductor strap 87, bracket 87', yoke 88, flexible conductors 89 and 89', fitting 90, shaft 59 and electrode holder 65; while the opposite end of the secondary loop is electrically connected to the lower electrode by way of yoke 88', flexible conductors 44 and 44', fitting 43, shaft 11 and electrode holder 16.

The important part of this secondary circuit is the equalizer yoke 88 and its associated flexible conductors 89, 89' for conducting the current to the upper electrode. Since the current is high and the voltage low, all conductors must be relatively heavy and of minimum resistance, to avoid a large IR loss; and there is also the problem of installing within a restricted space these conductors to a body which describes a wobble motion during the welding operation. As originally constructed, the one end of the primary loop was connected to the shaft 59 by a simple length conductor strap, having enough slack therein to permit the necessary wobble movement of the shaft. Test runs showed that during each welding cycle (by "cycle" is meant the complete progressive or walk-around welding of a capsule), the welding heat varied, resulting in welds that did not meet the high specifications required for products which must perform with a minimum chance of failure. Careful checking disclosed the fact that the weld heat, for a given setting of the heat control in the primary circuit, was higher at the beginning and termination of the cycle; it gradually dropped off from a given value at the start to a lower value as the intermediate portion of the cycle was reached and then built up to its initial or set value at the termination of the cycle. This could not be cured by adjusting the heat control potentiometer since the latter operates on the phase-shift principle, i.e. it advances or delays the firing of the thyratrons which form part of the electronic control circuit. It developed that the reason for this unequal heating action was the variable choke or inductive-reactance effect which resulted when the conductor which connected the one end of the secondary to the upper end of the shaft 59 "doubled back" upon itself as the shaft moved in a circular path about a common center during the welding cycle. By "doubling back" is meant the change in contour of the conductor which resulted when one length thereof approached and receded from another length or portion of the conductor. Such action might be compared to the distortion of a choke coil. It should be borne in mind that space and location restrictions enter into the problem, otherwise a single length of conductor might be so connected as to avoid the above-described action.

The problem was solved by the yoke 88 and its associated conductors 89, 89'. With this arrangement, the welding current divides at the yoke 88 and flows substantially equally through both conductors 89 and 89' to the shaft 59. Since the conductors now maintain their same relative positions throughout the welding cycle, any change in inductive reactance occurring in one conductor is compensated for by a change of the same magnitude but of opposite sign occurring simultaneously in the other conductor. The welding current and hence the welding heat now remains constant at the preset value throughout the welding operation. Thus there is provided a geometrically symmetrical low-resistance circuit for conducting the heavy welding current from the transformer secondary to the upper electrode which minimizes the effects of inductive reactance.

The yoke 88' for the lower electrode circuit has no known appreciable effect on the above-described action; it does, however, provide a convenient and low-resistance means for connecting the secondary loop to the lower electrode.

The entire upper half or upper fixture of the machine is mounted for vertical raising and lowering movement on a pair of upright guide rods 91 and 92, Figs. 1 and 3, anchored in the frame 10 of the lower fixture and insulated therefrom, the frame member 50 being provided with a pair of bored lugs 93 and 94 to accommodate such mounting. A power cylinder 95, Fig. 1, is supported on the top of a switch box 96, which in turn is supported by a guide cylinder 96' connected to the main frame structure. Within the power cylinder is a piston 97 having a piston rod 98, 98' which projects through the switch box 96 and guide 96' and is connected to the top frame plate 53. Air under pressure from a source of supply is conducted to the cylinder on opposite sides of the piston 97 by way of conduits 99 and 100.

The conduits 99 and 100 are connected to the casing of a power piston control valve 101, Fig. 5, having therein a valve member 101', which is actuated downwardly by solenoid 102 against the resistance of a spring 103, said spring normally moving the valve member to a position where it blocks the conduit 99 and opens the conduit 100 to line pressure by way of conduit 104. The arrangement is such that as long as the solenoid 102 is energized, the valve member 101' will be in its "down" position and hence the piston 97 will also be in its "down" position, but should the circuit to the solenoid 102 be broken, the spring 103 will move the valve member up, blocking conduit 99 and opening conduit 100, causing the piston 97 to be moved to its "up" position. The manner in which the solenoid valve 102 is controlled will be more fully hereinafter explained.

In order to facilitate breaking the seal between the upper frame annulus 51 and the seal ring 79 when the upper half or fixture of the machine is raised to open the welding chamber 15, a vent line 105 is connected into the welding chamber and is provided with a normally-closed solenoid valve 106. When the welding chamber is to be opened at the end of each welding cycle, the solenoid for the valve 106 is energized, opening the vent line 105 and breaking the vacuum in chamber 15.

*Controls*

Figure 6:
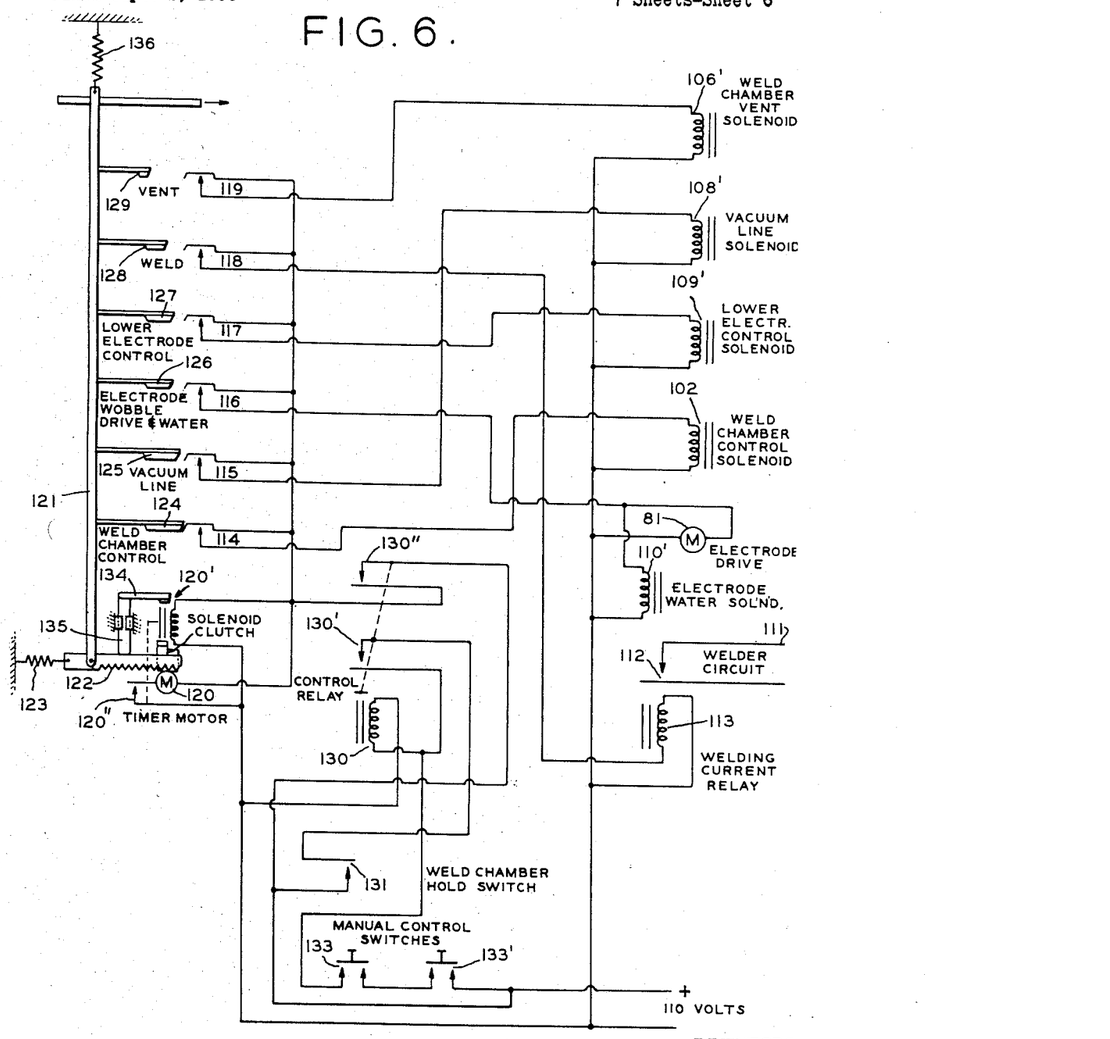
Fig. 6 is a schematic of the electric circuit for the controls of Fig. 5.

The controls and associated electric circuitry for operating the machine are shown schematically in Figs. 5 and 6. The solenoid for the vent valve 106 is indicated at 106' in Fig. 6. The pneumatic valve 47 is connected to the line pressure by way of conduit 107, 107' having therein a solenoid valve 108; and in Fig. 6 the solenoid for this valve is indicated at 108'. When valve 108 is de-energized, it is moved to a position where it blocks 107' and opens or vents 107 to atmosphere, the position shown in Fig. 5, the pneumatic valve 47 is closed and the vacuum pump 48 idles. The conduit 34, which conducts air under pressure to chamber 32 to raise the lower chuck or electrode holder, has therein a solenoid valve 109, and the solenoid for this valve is indicated at 109'. When valve 109 is in its "down" position (its solenoid 109' is energized), it closes off atmospheric air from the chuck-elevating chamber 32 and admits line air pressure to said chamber. The water or cooling fluid supply line 40, which conducts cooling fluid under pressure to the upper and lower electrodes, has therein a solenoid valve 110, the solenoid for which is indicated at 110'. The welding circuit for the electrodes 72 and 35 is indicated diagrammatically at 111; it has therein a normally-open switch 112, which is controlled by a welding current relay 113.

On the left-hand side of the schematic wiring diagram of Fig. 6 are a series of switches 114 to 119, inclusive, which are of the normally-open type. The switch 114 when closed completes the circuit to the weld chamber control solenoid 102; the switch 115 when closed completes the circuit to the vacuum line control solenoid 108'; the switch 116 when closed completes the circuit to the electrode drive motor 81 and also to the electrode water solenoid 110'; the switch 117 when closed completes the circuit to the lower electrode control solenoid 109'; the switch 118 when closed completes the circuit to the welding current relay solenoid 113; and the switch 119 when closed completes the circuit to the welding chamber vent solenoid 106'. These respective switches are under the control of a series of cams actuated by a timer motor 120, which has a driving connection with a switch cam bar 121 through a toothed rack 122, geared to the drive shaft of said motor, the said bar being urged towards a switch-open position by means of a spring 123. The bar 121 carries a series of switch-depressing or closing cams 124 to 129, inclusive. These switch cams are contoured and arranged in a manner such as to close the switches 114–119 in a predetermined or selective order, the said switches remaining closed until the operations controlled thereby are completed, whereupon they open in a predetermined reverse order. The motor 120 is provided with a solenoid type clutch, the solenoid for which is indicated at 120'. When solenoid 120' is energized, the motor drive shaft is clutched to the rack bar 122, and switch 120" is closed to start the motor 120; and when the said solenoid is deenergized, the motor drive shaft is de-clutched, permitting rack bar 121 to be retracted by spring 123.

A main control relay solenoid is indicated at 130; it controls normally-open switches 130' and 130". The switch indicated at 131 is of the normally-open type, which is closed when engaged by a switch-closer 132, carried by the piston rod for the piston 97, see Fig. 1. The switches indicated at 133 and 133' are a pair of spaced manual control switches arranged in series in the supply line to one side of the control relay 130 and also in parallel with switch 131. The purpose of this particular arrangement of switches will be explained in the description of operation, which follows.

Operation

In the position of the parts as shown in Figs. 5 and 6, the piston 97 in the cylinder 95 is up and hence the welding chamber 15 is open, the lower electrode 35 is down, water to the electrodes is cut off, and the pneumatic valve 47 is closed, permitting the vacuum pump 48 to idle.

To start the welding cycle, and assuming a pair of aneroid capsule shells or diaphragms have been placed on the lower electrode 35, the operator closes both of the switches 133 and 133'. When this happens, the solenoid 130 is energized, closing switches 130' and 130", and current flows to the clutch solenoid 120', whereupon the drive mehanism of timer motor 120 is clutched to the rack bar 122, and switch 120" is closed, starting the timer motor 120. The switch bar 121 now moves to the right, and the following operations occur:

(a) Switch 114 closes and the valve member 101' moves downwardly against the resistance of spring 103, blocking the air line 100 to the bottom of piston 97 and opening the line 99 to the top of said piston, and the upper welding fixture starts to move downwardly and close the welding chamber 15. (When piston 97 lowers to a point where switch 131 closes, the operator may release the manual switches 133, 133'. This part of the circuit will be more fully described.)

(b) Switch 115 closes, whereupon current flows to the vacuum line solenoid 108' and valve 108 opens, blocking the line to atmosphere and admitting air under pressure to the pneumatic valve 47, which then opens and evacuation of the welding chamber 15 proceeds.

(c) Switch 116 closes, whereupon current flows to the electrode drive motor 81, and at the same time the electrode water control solenoid 110' opens the valve 110 and water begins to circulate through the lower and upper electrode holders 16 and 65.

(d) At substantially the same time as (c) takes place, switch 117 closes and current flows to the lower electrode control solenoid 109', valve 109 blocks the line to atmosphere and admits air under pressure to the chamber 32 and the lower electrode holder rises, bringing the work thereon in engagement with the upper electrode 72.

(e) Switch 118 closes and welding current flows to the upper and lower electrodes and welding begins.

The dwell periods of the cams 124 to 129, inclusive, are such as to permit the welding operation to be fully completed before any of these cams clear their coacting switches. Hence during the actual welding operation, chamber 15 remains closed and sealed, evacuation by the pump 48 steadily increases until the desired degree of evacuation is attained, and cooling water is being constantly circulated through the electrode holders 16 and 65. This circulating action is positive and is through channels designed for uniform cooling of the electrodes.

(f) Switch 118 opens and the welding current is cut off from the upper and lower electrodes.

(g) Switch 117 opens, line air pressure to the chamber 32 is cut off and the lower electrode holder carrying the lower electrode with the welded and evacuated capsule thereon is lowered.

(h) Switch 116 opens, the drive on the electrode wobble gear 55 stops, and the electrode water supply is cut off.

(i) Switch 115 opens and the vacuum pull to the weld chamber 15 is cut off.

(j) Cam 129 closes switch 119, whereupon the vent valve 106 is opened and the welding chamber 15 is vented to the atmosphere.

(k) Switch 114 opens, the solenoid 102 is deenergized and spring 103 moves valve member 101 to its "up" position, whereupon air is admitted to the cylinder 95 below the piston 97 and the upper fixture of the machine is raised, opening the welding chamber 15 and permitting the operator to reload the lower electrode for repetition of the cycle.

When the piston 97 moves up to open the welding chamber, switch 131 opens, whereupon the control relay solenoid 130 is deenergized (the operator having previously released manual switches 133 and 133') and this in turn produces deenergization of the clutch solenoid 120'. The rack bar 122 is now de-clutched from the motor 120 and at the same time the switch 120" opens and the motor stops. When the rack bar 122 is freed, it is pulled to the left by spring 123, carrying with it the cam bar 121 and the cams supported thereon. The clutch solenoid 120' has operatively associated therewith an armature 134, to which is connected a slidable abutment 135, adapted to ride on the rack bar 122 when the motor 120 drives the latter to the right as viewed in Fig. 6. This prevents the cam bar 121 from being pulled upwardly by spring 136 as long as the solenoid 120' is energized. However when the latter is deenergized, the abutment 135 is released and spring 136 pulls the cam bar 121 upwardly. Thus when the spring 123 retracts the said bar, the cams carried thereby will move upwardly and clear the switches 114–119. This avoids closure of the said switches when the cam bar is moved back for repetition of the welding cycle, the position as viewed in Fig. 6.

The use of the two spaced manual control switches 133, 133' in parallel with switch 131 is a safety factor. When an operator closes both of the switches 133, 133' it requires both hands; and when these switches are closed and the piston 97 moves downwardly, the latter will continue to move downwardly until switch 131 is closed, at which point the welding chamber 15 is substantially closed. Should the operator remove either one or both hands from the switches 133, 133' before the welding chamber is closed (due for instance to an attempt to adjust the work on the lower electrode), the control relay solenoid 130 will immediately become deenergized, in turn deenergizing solenoid winding 102, whereupon the spring 103 will immediately push the valve 101 upwardly, admitting air to the lower side of the piston 97 and causing the piston to also move upwardly, carrying with it the upper welding fixture and opening the welding chamber. However, once the piston 97 has moved downwardly to a point where switch 131 closes, the hand or finger switches 133, 133' are by-passed and the control relay 130 is connected directly to the hot side of the line. Now the operator may release the switches 133, 133' and the drive on the timer motor will continue until a welding cycle is completed. At the completion of the welding cycle, the piston 97 moves upwardly, whereupon the switch 131 will open; and since the switches 133, 133' are also now open, the circuit to the control relay solenoid 130 will open, stopping the drive on the timer motor 120.

From the foregoing it will be seen that a machine is provided whereby articles comprised of weldable material may be electrically welded in an evacuated chamber. There may be times when it may be found desirable to charge the chamber with a suitable gas following evacuation, to improve the quality of the weld. This may be provided for simply by installing an inert gas supply line controlled by a valve similar to the valve 106, or the latter could be changed to a three-way valve and control both the vent line and gas-supply line. By timing the circulation of the cooling fluid through the electrodes so that such circulation takes place only during the welding operation and while the welding chamber is evacuated, the electrodes do not tend to "frost up" due to condensation of moisture thereon. Should moisture accumulate on the electrodes, it would affect the degree of evacuation for a given period and "pull" by the suction pump, so that the evacuation pressure would tend to vary from the set point in different capsules.

The progressive seam-welding method is of advantage in the production of aneroid capsules, since evacuation need not necessarily be timed to a precise degree due to the fact that the seam remains open until the upper electrode has been rotated bodily to the point of completion of the weld. While venting the welding chamber before opening the latter is not essential, it does materially assist in reducing the force required to open the chamber, thereby reducing the power required for such purpose and also reducing wear and tear on the machine.

As heretofore noted, the machine may be adapted for electric welding of numerous articles other than aneroid capsules simply by changing the electrodes to conform to the character of the work, and it will also be obvious that the single practical embodiment of the invention illustrated and described herein is susceptible of modification and change in design to carry out various types of welding operations without departing from the scope of the invention.

What is claimed is:

1. In an electric welding machine, means providing a plurality of interfitting welding chamber sections which when joined define a closed welding chamber, electrode means and a movable support therefor mounted in at least one of said sections, means for imparting relative movement to said sections to close and open said chamber, means for driving said movable electrode support in a substantially cycloidal path during the welding operation, means for evacuating said chamber when the latter is closed, and means sealing said chamber against the entrance of atmospheric air around said movable support.

2. In an electric welding machine, a pair of electrodes contoured to engage a work-piece held therebetween, electrode holders for said electrodes, means encircling said holders providing the two halves of a welding chamber, means for imparting relative movement to said halves along with said electrode holders to bring said halves into abutting sealed relation and said electrodes into operative position at the start of each welding operation, at least one of said holders having limited movement toward and from welding position independently of its surrounding half-chamber, means for evacuating the chamber when closed, means for driving the other of said electrode holders and the electrode carried thereby in a substantially cycloidal path during each welding operation, and means for separating said electrodes and halves of said chamber upon completion of each welding operation.

3. In a welding machine, a lower welding fixture comprising a first electrode holder and frame structure surrounding said holder providing with the latter the half-section of a welding chamber, power means for exerting an upward force on the electrode holder during the welding operation, a coacting upper fixture arranged in substantially opposed relation to said first-named fixture and comprising a second electrode holder and frame structure encircling said latter holder providing the other half of the welding chamber, means for driving said second-named electrode holder in a substantially cycloidal path, power means for lowering and raising said upper fixture into and from chamber-closing position with respect to the lower fixture, and means for evacuating said chamber when said fixtures are moved to chamber-closing position.

4. In a welding machine, a base fixture comprising a first electrode holder or chuck and encircling framework providing one of the halves of a welding chamber, power means for exerting an upward thrust on said holder during each welding operation, an opposing fixture comprising a second electrode holder and encircling framework providing the other half of the welding chamber, said second-named holder being movably mounted within its surrounding framework, a flexible seal connected between each of said holders and encircling framework, power means for lowering and raising said second-named fixture into and from chamber-closing position with respect to said base fixture, means for driving said second-named electrode holder in a substantially cycloidal path during each welding operation, and means for evacuating the welding chamber when said halves are moved into chamber-closing position.

5. In a welding machine, a first fixture comprising an electrode holder or chuck and encircling framework providing a section of a welding chamber, an opposing fixture comprising a second electrode holder and encircling framework providing a coacting section of the welding chamber, means for imparting relative movement to said sections to move the latter into and from chamber-closing position, means providing a seal between said holders and encircling framework and also between said sections when the latter are in chamber-closing position, electrodes supported by said holders, means for conducting current to said electrodes during a welding operation, means for circulating a cooling fluid to said electrodes when said sections are in chamber-closing position, and means for evacuating said chamber when the latter is closed.

6. A welding machine as claimed in claim 5 wherein said electrode holders and electrodes are formed with communicating channels and means are provided for circulating a cooling fluid through said channels, said means being timed to circulate said cooling fluid only while said sections are in chamber-closing position.

7. A welding machine as claimed in claim 5 wherein said electrode holders and electrodes are provided with communicating channels and means are provided for circulating a cooling fluid through said channels, said circulating means being timed with the movement of said sections into chamber-closing and opening position to produce circulation of said fluid only while said chamber is closed.

8. In a welding machine, a first fixture comprising an electrode holder or chuck and encircling framework providing a section of the welding chamber, an opposing fixture comprising a second electrode holder and encircling framework providing a coacting section of the welding chamber, means for imparting relative movement to said sections to move the latter into and from chamber-closing position, means providing flexible seals between said holders and encircling framework and also between said sections when the latter are in chamber-closing position, electrodes supported by said holders, means for conducting welding current to said electrodes during a welding operation, means for driving said second electrode holder and its electrode in a substantially cycloidal path within its encircling framework during a welding operation, means for holding the said second electrode holder against rotation, and means for evacuating said chamber when the latter is closed.

9. A welding machine as claimed in claim 8, wherein said means for holding the second electrode holder against rotation comprises a crank-arm having its one end journaled in the encircling framework of said second electrode holder and its opposite end terminating in a finger having a pivotal connection with said latter holder.

10. In a welding machine, a first fixture comprising an electrode holder or chuck and encircling framework providing a section of a welding chamber, an opposing fixture comprising a second electrode holder and encircling framework providing a coacting section of the welding chamber, means for imparting relative movement to said sections to move the latter into and from chamber-closing position, means providing flexible seals between said holders and encircling framework and also between said sections when the latter are in chamber-closing position, means for conducting welding current to said electrodes during a welding operation, means for evacuating said chamber when said sections are in chamber-closing position, and means for venting said chamber to the atmosphere to facilitate separation of said sections when the latter are moved from chamber-closing position.

11. In a welding machine, a base fixture comprising a first electrode holder or chuck and encircling framework providing one of the halves of a welding chamber, an opposing upper fixture comprising a second electrode holder and encircling framework providing the second half of the welding chamber, power means for moving said upper fixture into and from chamber-closing position with respect to the base fixture, flexible seals interposed between said holders and encircling framework and also between said sections when the latter are in chamber-closing position, electrodes supported by said holders, means for conducting welding current to said electrodes during a welding operation, means for evacuating said chamber when the latter is closed, and power means for exerting an upward thrust on said lower electrode holder during a welding operation.

12. In a welding machine, a base fixture comprising a first electrode holder or chuck and encircling framework providing one of the halves of a welding chamber, an upper fixture comprising a second electrode holder and encircling framework providing the second half of the welding chamber, means for moving said upper fixture into and from chamber-closing position with respect to the base fixture, means for evacuating said chamber when the latter is closed, electrodes supported by said holders, means for conducting welding current to said electrodes during a welding operation, and a resiliently mounted element carried by the upper fixture and adapted to engage the work supported between said electrodes to hold the work against displacement during the welding operation.

13. In a welding machine, a pair of electrodes contoured to support a work-piece therebetween, a bodily movable member having a drive connection with one of said electrodes for progressively moving the latter in a generally circular path during a welding cycle, and means for supplying welding current to said electrodes including a transformer secondary circuit having a secondary loop electrically connected to said electrodes, the connection to said driven electrode being by way of said member and including a coupling network comprising a generally U-shaped substantially rigid conductor yoke and a pair of flexible conductors connecting the free ends of said yoke to said member, said yoke and coacting flexible conductors defining a self-compensating loop for reducing the effects of varying inductive reactance on the welding current applied across said electrodes.

14. In a welding machine, a pair of electrodes contoured to support a work-piece therebetween, a shaft supporting one of said electrodes for progressive movement in a generally circular path during a welding cycle, means for driving said shaft in a substantially cycloidal path, and means for supplying welding current to said electrodes including a transformer secondary circuit having a secondary loop including said shaft and said electrodes, the connection to said shaft being by way of a coupling network comprising a generally U-shaped substantially rigid conductor yoke having one end of the transformer secondary loop connected to an intermediate portion thereof and a pair of flexible conductors connecting the free ends of said yoke to said shaft, said yoke and coacting flexible conductors defining a self-compensating loop for reducing the effects of varying inductive reactance on the current applied across said electrodes.

15. In a welding machine, a first fixture comprising an electrode holder or chuck and encircling framework providing a section of a welding chamber, an opposing fixture comprising a second electrode holder and encircling framework providing a coacting section of a welding chamber, electrodes supported by said holders, means for imparting relative movement to said sections to move the latter into and from chamber-closing position, a first solenoid valve for controlling said means, means for venting said chamber to facilitate separation of said sections, a second solenoid valve for controlling said venting means, means for circulating a fluid in heat-exchange relation with said electrodes, a third solenoid valve for controlling said fluid-circulating means, means for evacuating said chamber, a fourth solenoid valve for controlling said evacuating means, and an electric circuit for controlling the operation of said machine including a plurality of switches arranged to operate said solenoid valves in a predetermined sequence.

16. In a welding machine, a first fixture comprising a lower electrode holder or chuck and encircling framework providing a section of a welding chamber, a second fixture comprising an upper electrode holder and encircling framework providing a coacting section of a welding chamber, electrodes supported by said holders, a welding current circuit including a first solenoid valve for controlling the flow of current to said electrodes, power means for imparting relative movement to said sections to move the latter into and from chamber-closing position, a second solenoid valve for controlling said power means, means for venting the welding chamber when closed to facilitate separation of said sections when moving the latter to chamber-open position, a third solenoid valve for controlling said venting means, means for circulating a cooling fluid in heat-exchange relation with said electrodes, a fourth solenoid valve for controlling said fluid-circulating means, means including an electric motor for actuating said upper electrode holder in a substantially cycloidal path within its encircling framework, fluid pressure means for exerting a thrust on said lower electrode holder or chuck to ensure proper welding contact with the work during the welding operation, a fifth solenoid valve for controlling said fluid pressure means, means for evacuating said chamber, a sixth solenoid valve for controlling said evacuating means, and an electric circuit for said machine including a plurality of switches arranged to operate said solenoid valves and said motor in a predetermined sequence.

17. A welding machine as claimed in claim 16 in which said switches are moved to open and closed positions by power-driven means and a manual control is provided for controlling said latter means.

18. In a welding machine, a first fixture comprising a lower electrode holder or chuck and encircling framework providing the half section of a welding chamber, a second fixture comprising an upper electrode holder and encircling framework providing the other half section of a welding chamber, electrodes supported by said holders, a control system and associated electric control circuit including a first solenoid valve for controlling the flow of current to said electrodes, power means including a fluid-actuated piston for moving said upper section into and from chamber-closing position with respect to said lower section, a second solenoid valve for controlling the flow of fluid under pressure to said piston, means for venting the welding chamber to the atmosphere to facilitate separation of said sections when moving the upper section to chamber-open position, a third solenoid valve for controlling said venting means, means for circulating a cooling fluid in heat-exchange relation with said electrodes, a fourth solenoid valve for controlling said circulating means, means including an electric motor for actuating said upper electrode holder in a substantially cycloidal path within its encircling framework, fluid pressure means for exerting a thrust on said lower electrode holder or chuck to insure proper welding contact with the work during the welding operation, a fifth solenoid valve for controlling said fluid-pressure means, means for evacuating said chamber, a sixth solenoid valve for controlling said evacuating means, a plurality of switches for controlling said solenoid valves and motor, a series of switch-actuating members for actuating said switches in a given sequential order, a movable carrier on which said switch-actuating members are mounted, a motor for controlling said carrier, and a manual control for said latter motor.

19. A machine as claimed in claim 18 wherein the solenoid valve member for controlling the flow of fluid to said power piston is normally urged to a position in which the piston will move the upper fixture in a chamber-opening direction, the manual control for said carrier motor comprises a pair of spaced manual control switches arranged in series in the carrier motor control circuit which connect the said motor to a source of electrical energy only so long as both are held closed, there is a by-pass circuit which by-passes said manual switches and connects said motor control circuit direct to a source of electric energy, said by-pass circuit having therein a normally-open switch located so that it will be closed when said piston and hence the upper fixture is in closed or near-closed position and maintain the carrier motor energized until the welding operation is completed irrespective of whether or not said manual switches are held closed.

20. In a machine for fabricating evacuated aneroid capsules made up of a pair of reversely dished diaphragms or half-shells having peripheral flanges joined by welding, a lower fixture comprising an electrode holder, an electrode supported by said holder and contoured to receive a diaphragm and having an edge portion on which the flange of the diaphragm is adapted to rest, framework encircling the electrode holder and which together with said holder and electrode define the lower half-section of a welding chamber; an upper fixture comprising a second electrode holder, a second electrode supported by said holder and having an edge portion complementary to the edge portion of the lower electrode, a wobble head supporting said upper electrode holder, framework encircling said wobble head and which together with said upper holder and its electrode define the upper half-section of the welding chamber; means for imparting relative movement to said fixtures and the half-sections carried thereby to close and open the welding chamber and to also move the electrodes into and from operative welding contact with the flanges of said diaphragms; means for subjecting said flanges to a welding current across said electrodes, means for actuating said wobble head in a substantially cycloidal path within its encircling framework during each welding operation, and means for also evacuating said chamber during each welding operation.

21. In an electric welding machine, coacting interfitting welding-chamber sections which when joined define a closed welding chamber, means for moving said sections to and from chamber-forming positions, a pair of electrodes contoured to engage a work-piece therebetween, electrode holders for said electrodes, a support for each of said holders, at least one of said holders and its support having limited movement toward and from welding position independently of said welding chamber sections, and means for evacuating said chamber of atmospheric air when said sections are moved to chamber-forming position.

22. In an electric welding machine, coacting interfitting welding-chamber sections which when joined define a closed welding chamber, means for moving said sections to and from chamber-forming positions, a pair of oppositely-disposed electrodes contoured to engage a workpiece therebetween, electrode holders for said electrodes, one of said holders having limited reciprocatory movement toward and from welding position independently of said welding chamber sections and the other of said holders being mounted for limited movement in a substantially cycloidal path also independently of said sections, and means for evacuating said chamber of atmospheric air when said sections are moved to chamber-forming position.

23. In an electric welding machine, coacting interfitting welding chamber sections which when joined define a closed welding chamber, means for moving said sections to and from chamber-forming positions, welding electrodes and holders therefor movable to and from operative position with said chamber-forming sections, means movably supporting one of said electrode holders and its electrode for limited movement independently of said sections when said chamber is closed, means for driving said movable supporting means in a substantially cycloidal path during a welding operation, and means for evacuating said chamber of atmospheric air when said sections are moved to chamber-forming position.

24. In a welding machine, a welding fixture comprising a first electrode holder, a support therefor and encircling framework providing a section of a welding chamber; an opposing fixture comprising a second electrode holder, a support therefor and encircling framework providing a coacting section of a welding chamber, means for imparting relative movement to said fixtures to move the latter to and from chamber-closing position, the said encircling framework being provided with coacting sealing surfaces which abut and effect sealing of the welding chamber when the fixtures are moved to chamber-closing position, said first electrode holder having limited reciprocatory movement within its encircling framework to enable an electrode carried thereby to be moved into and maintained in welding position with respect to a coacting electrode carried by said second holder after the chamber has been closed and sealed.

25. In a machine for fabricating evacuated capsules, each capsule including at least one diaphragm having a peripheral flange of weldable material connected to a member having a jointure surface also of weldable material, a pair of electrodes, electrode holders for said electrodes, framework encircling said holders and providing in conjunction therewith interfitting sections of a complete welding chamber, means for moving said sections to chamber-forming position, said framework having complementary sealing surfaces which are brought into abutting sealed relation during the welding operation to close the welding chamber and confine the electrodes and the work to be welded within said chamber, means for evacuating the chamber so provided during each welding operation, means for conducting a welding current to said electrodes, and means for progressively welding said flange to said surface as evacuation proceeds.

References Cited in the file of this patent

UNITED STATES PATENTS

| | | |
|---|---|---|
| 1,196,852 | Fulda | Sept. 5, 1916 |
| 1,427,753 | Budd et al. | Aug. 29, 1922 |
| 1,728,171 | Badger | Sept. 17, 1929 |
| 2,254,436 | Mallett | Sept. 2, 1941 |
| 2,326,296 | Harrison et al. | Aug. 10, 1943 |
| 2,346,645 | Bayles | Apr. 18, 1944 |
| 2,474,129 | Tramontini | Jan. 21, 1949 |
| 2,743,341 | Riley | Apr. 24, 1956 |